(12) United States Patent
Kondo et al.

(10) Patent No.: US 10,848,551 B2
(45) Date of Patent: Nov. 24, 2020

(54) INFORMATION PROCESSING APPARATUS, PARALLEL COMPUTER SYSTEM, AND METHOD FOR CONTROL

(71) Applicant: FUJITSU LIMITED, Kawasaki-shi, Kanagawa (JP)

(72) Inventors: Yuji Kondo, Kawasaki (JP); Takashi Arakawa, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/538,882

(22) Filed: Aug. 13, 2019

(65) Prior Publication Data
US 2020/0076880 A1 Mar. 5, 2020

(30) Foreign Application Priority Data
Aug. 28, 2018 (JP) .................................. 2018-159280

(51) Int. Cl.
*H04L 29/08* (2006.01)
*G06F 15/173* (2006.01)
(Continued)

(52) U.S. Cl.
CPC ............ *H04L 67/10* (2013.01); *G06F 9/3885* (2013.01); *G06F 9/522* (2013.01); *G06F 9/546* (2013.01);
(Continued)

(58) Field of Classification Search
CPC .... G06F 9/522; G06F 9/3851; G06F 9/30087; G06F 9/3887; G06F 9/52; G06F 9/3001; G06F 9/3885; G06F 15/76; G06F 17/142; G06F 9/3004; G06F 9/3012; G06F 9/4881; G06F 11/3404; G06F 11/3476;
(Continued)

(56) References Cited

U.S. PATENT DOCUMENTS

| 6,560,624 B1 * | 5/2003 | Otani .................. G06F 7/535 708/655 |
| 7,584,342 B1 * | 9/2009 | Nordquist ............ G06F 9/3851 712/22 |

(Continued)

FOREIGN PATENT DOCUMENTS

| JP | 60-230300 | 11/1985 |
| JP | 2-72480 | 3/1990 |

(Continued)

*Primary Examiner* — Greg C Bengzon
(74) *Attorney, Agent, or Firm* — Fujitsu Patent Center

(57) ABSTRACT

In a parallel computer system having multiple information processing apparatuses, a first information processing apparatus includes circuitry configured to wait for calculation target data from each of one or more other information processing apparatuses being included in the plurality of information processing apparatus; carry out an average calculation that calculates an average value of a plurality of calculation target data including the waited calculation target data; and transmit the calculated average value to a second information processing apparatus being one of the plurality of information processing apparatuses and being different from the other information processing apparatuses. This configuration makes it possible to achieve highly-precise collective average calculation without requiring bit expansion.

18 Claims, 12 Drawing Sheets

(51) Int. Cl.
   *G06F 9/38* (2018.01)
   *G06F 9/54* (2006.01)
   *G06F 9/52* (2006.01)

(52) U.S. Cl.
   CPC .. *G06F 15/17306* (2013.01); *G06F 15/17325* (2013.01)

(58) Field of Classification Search
   CPC ............... G06F 13/423; G06F 15/7867; G06F 16/9024; G06F 7/501; G06F 7/535; G06F 8/458; G06F 9/30014; G06F 9/30036; G06F 9/3009; G06F 9/485; G06F 9/54; G06F 11/0727; G06F 11/0793; G06F 11/104; G06F 11/1048; G06F 11/1497; G06F 11/1641; G06F 11/2236; G06F 11/3024; G06F 11/3072; G06F 11/3409; G06F 11/3419; G06F 11/3423; G06F 11/3608; G06F 12/0835; G06F 12/0859; G06F 13/1657; G06F 13/28; G06F 15/163; G06F 15/167; G06F 15/17312; G06F 15/17325; G06F 15/17337; G06F 15/8092; G06F 15/82; G06F 15/825; G06F 16/1858; G06F 16/212; G06F 16/2477; G06F 1/32; G06F 1/3206; G06F 1/324; G06F 1/3296; G06F 2201/815; G06F 2201/88; G06F 2205/003; G06F 2207/3816; G06F 2207/4802; G06F 2207/535; G06F 2207/5352; G06F 2209/483; G06F 2212/621; G06F 30/34; G06F 5/01; G06F 7/485; G06F 7/4873; G06F 7/49942; G06F 7/49947; G06F 7/49957; G06F 7/5095; G06F 7/523; G06F 7/5375; G06F 7/57; G06F 7/76; G06F 8/45; G06F 9/30018; G06F 9/30058; G06F 9/30072; G06F 9/30098; G06F 9/30123; G06F 9/30127; G06F 9/30138; G06F 9/30145; G06F 9/3016; G06F 9/30167; G06F 9/325; G06F 9/38; G06F 9/3824; G06F 9/3826; G06F 9/3832; G06F 9/3834; G06F 9/3836; G06F 9/3842; G06F 9/3853; G06F 9/3857; G06F 9/3867; G06F 9/3889; G06F 9/3897; G06F 9/4843; G06F 9/4887; G06F 9/5016; G06F 9/5027; G06F 9/5044; G06F 9/5066; G06F 9/524; G06F 9/544; G06F 9/546; H04L 45/02; H04L 27/2647; H04L 27/38; H04L 41/0823; H04L 43/00; H04L 43/02; H04L 45/04; H04L 45/12; H04L 67/10; H04L 67/2842; H04L 9/06; H04L 9/30; H04L 9/3066; H04L 9/32; H04L 9/3247; G06G 7/14; G06N 20/00; H01L 21/8258; H01L 27/0605; H03K 19/1737; H03K 19/17708; H03K 19/17728; H03K 21/10; H03K 3/356008; H03M 9/00; H04J 3/047; H04J 3/0632

See application file for complete search history.

(56) References Cited

U.S. PATENT DOCUMENTS

| | | | |
|---|---|---|---|
| 7,640,284 B1* | 12/2009 | Goodnight | G06F 17/142 708/404 |
| 7,788,468 B1* | 8/2010 | Nickolls | G06F 9/3834 712/22 |
| 7,836,116 B1* | 11/2010 | Goodnight | G06F 17/142 708/404 |
| 7,861,060 B1* | 12/2010 | Nickolls | G06F 9/3887 712/22 |
| 8,392,900 B1* | 3/2013 | Collard | G06F 8/458 717/159 |
| 8,468,329 B2* | 6/2013 | Vorbach | G06F 9/3885 713/1 |
| 9,294,551 B1* | 3/2016 | Froese | H04L 67/10 |
| 9,411,778 B2* | 8/2016 | Sun | G06F 15/76 |
| 10,482,209 B1* | 11/2019 | Gorski | G06F 30/34 |
| 2002/0116595 A1* | 8/2002 | Morton | G06F 12/0859 712/22 |
| 2002/0172297 A1* | 11/2002 | Ouchi | H04L 27/38 375/316 |
| 2003/0002474 A1* | 1/2003 | Alexander | H04J 3/047 370/351 |
| 2007/0226288 A1 | 9/2007 | Inagaki et al. | |
| 2008/0126758 A1* | 5/2008 | Kwon | G06F 9/3001 712/221 |
| 2008/0147881 A1* | 6/2008 | Krishnamurthy | H04L 45/02 709/238 |
| 2008/0256331 A1* | 10/2008 | Tanabe | G06F 9/30036 712/28 |
| 2009/0037707 A1* | 2/2009 | Blocksome | G06F 9/52 712/231 |
| 2010/0100210 A1* | 4/2010 | Mecchia | G06F 7/49942 700/94 |
| 2010/0124241 A1* | 5/2010 | Hiramoto | G06F 9/4843 370/509 |
| 2011/0252264 A1* | 10/2011 | Solinas | G06F 9/522 713/400 |
| 2012/0017066 A1* | 1/2012 | Vorbach | G06F 9/3885 712/11 |
| 2012/0060019 A1 | 3/2012 | Hiramoto et al. | |
| 2012/0159019 A1* | 6/2012 | Inoue | G06F 9/522 710/58 |
| 2012/0203881 A1* | 8/2012 | Suto | H04L 41/0823 709/223 |
| 2012/0254881 A1* | 10/2012 | Hamamoto | G06F 9/4887 718/102 |
| 2012/0297221 A1* | 11/2012 | Ohnuki | G06G 7/14 713/320 |
| 2013/0125097 A1* | 5/2013 | Ebcioglu | G06F 30/30 717/136 |
| 2013/0166879 A1* | 6/2013 | Sun | G06F 9/30087 712/30 |
| 2014/0149719 A1* | 5/2014 | Tabaru | G06F 9/30036 712/221 |
| 2014/0149994 A1* | 5/2014 | Ihara | G06F 9/522 718/108 |
| 2014/0195578 A1* | 7/2014 | Mukunoki | G06F 17/142 708/404 |
| 2015/0026687 A1* | 1/2015 | Yim | G06F 9/522 718/102 |
| 2015/0052537 A1* | 2/2015 | Gaster | G06F 9/522 718/106 |
| 2015/0067695 A1* | 3/2015 | Hamamoto | G06F 9/5066 718/104 |
| 2015/0106596 A1* | 4/2015 | Vorbach | G06F 15/7814 712/221 |
| 2015/0154058 A1* | 6/2015 | Miwa | G06F 11/3404 719/313 |
| 2015/0169369 A1* | 6/2015 | Baskaran | G06F 9/4881 718/102 |
| 2015/0277909 A1* | 10/2015 | Nomoto | G06F 9/3853 712/24 |
| 2016/0313977 A1* | 10/2016 | Dockser | G06F 5/01 |
| 2017/0083343 A1* | 3/2017 | Burger | G06F 9/3867 |
| 2017/0160783 A1* | 6/2017 | Kawabe | G06F 1/3206 |
| 2017/0300830 A1* | 10/2017 | Kadav | G06F 15/17312 |
| 2018/0006817 A1* | 1/2018 | van Splunter | G06F 7/501 |
| 2018/0276127 A1* | 9/2018 | Ishiyama | G06F 15/163 |
| 2018/0307985 A1* | 10/2018 | Appu | G06N 3/063 |
| 2019/0018815 A1* | 1/2019 | Fleming | G06F 15/825 |
| 2019/0026149 A1* | 1/2019 | Jiang | G06T 1/20 |

(56) References Cited

U.S. PATENT DOCUMENTS

| | | | |
|---|---|---|---|
| 2019/0034553 A1* | 1/2019 | Ni | G06F 16/212 |
| 2019/0102242 A1* | 4/2019 | Sullivan | G06F 11/1497 |
| 2019/0121678 A1* | 4/2019 | Knowles | G06F 13/1657 |
| 2019/0265976 A1* | 8/2019 | Goryavskiy | G06F 9/30054 |
| 2019/0310847 A1* | 10/2019 | Grocutt | G06F 9/30036 |
| 2019/0324757 A1* | 10/2019 | Valerio | G06F 9/3851 |
| 2019/0347140 A1* | 11/2019 | Wilkinson | G06F 9/522 |
| 2019/0377549 A1* | 12/2019 | Alben | G06F 7/49947 |

FOREIGN PATENT DOCUMENTS

| | | |
|---|---|---|
| JP | 2007-257269 | 10/2007 |
| JP | 2010-122848 | 6/2010 |
| JP | 2012-058958 | 3/2012 |
| JP | 2012-128808 | 7/2012 |

* cited by examiner

FIG. 6

```
input [4:0]      inputA;
input [4:0]      inputB;
input            ave_vld;
input            CLK;
input            RESET_X;
output [4:0]     output;
work [5:0]       work;

always @ (posedge CLK or negedge RESET_X) begin
  if(RESET_X == 1'b0) begin
    work[5:0]    <= 6'h00;
  end
  else if(ave_vld) begin
    work[5:0]    <= {1'b0,inputA[4:0]}+{1'b0,inputB[4:0]};   ← P1
  end
end
assign output[4:0] = work[5:1];   ← P2
```

FIG. 10

| NODE #0 | NODE #1 | NODE #2 | NODE #3 |  | SUM |
|---|---|---|---|---|---|
| 1 | 7 | 13 | 19 | → | 40 | data

INFORMATION PROCESSING APPARATUS, PARALLEL COMPUTER SYSTEM, AND METHOD FOR CONTROL

CROSS-REFERENCE TO RELATED APPLICATION

This application is based upon and claims the benefit of priority of the prior Japanese Patent application No. 2018-159280, filed on Aug. 28, 2018, the entire contents of which are incorporated herein by reference.

FIELD

The embodiment discussed herein is directed to an information processing apparatus, a parallel computer system, and a method for control.

BACKGROUND

A parallel computer system, which includes multiple nodes and carries out calculations using these nodes in parallel with one another, has been known for performing a reduction calculation.

A reduction calculation is a calculation performed on data held by multiple processes. Known Examples of a reduction calculation is a calculation to obtain the total sum of data, and a calculation to obtain a maximum value and a minimum value of data.

Figure 10:
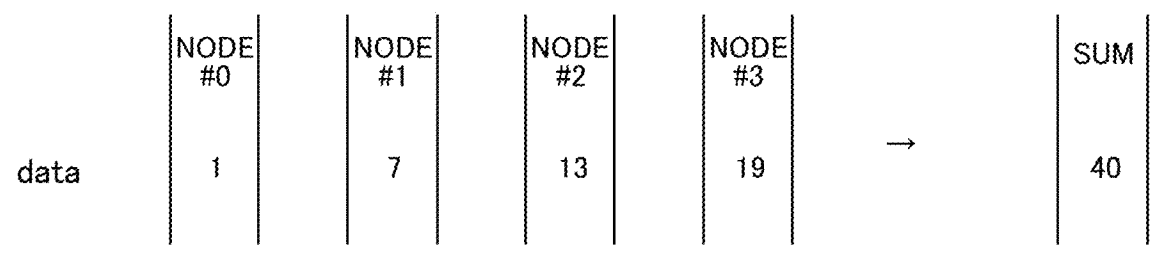

FIG. 10 is a diagram illustrating a reduction calculation.

The example of FIG. 10 is a reduction calculation to obtain the total sum of data held by four nodes #0 to #3. Specifically, FIG. 10 illustrates an example of calculating the total sum "40" of the data "1", "7", "13", and "19" held by the nodes #0, #1, #2, and #3, respectively.

[Patent Literature 1] Japanese Laid-open Patent Publication No. 2010-122848
[Patent Literature 2] Japanese Laid-open Patent Publication No. 2012-128808
[Patent Literature 3] Japanese Laid-open Patent Publication No. 2012-58958
[Patent Literature 4] Japanese Laid-open Patent Publication No. 2007-257269
[Patent Literature 5] Japanese Laid-open Patent Publication No. HEI 2-72480

In calculating a total sum of data of multiple nodes in a traditional parallel computer system, higher bits may disappear due to an overflow unless a digit bit (region) to make up the carry bit is expanded each time a calculation is performed.

FIG. 11 is a diagram illustrating a calculation of a total sum in a traditional parallel computer.

In the example of FIG. 11, each of the nodes #0 to #3 includes a five-bit reduction adder. The numbers that five bits can express are 0 to 31.

Here, consideration will now be made in relation to a calculation of the total sum of the data "1", "7", "13", and "19" of the nodes #0, #1, #2, and 1#3, respectively, by dividing the calculation into two additions like (1+7)+(13+19).

The first addition is 1+7=8, and the sum "8" is represented by "1000" in a binary number system, which a five-bit reduction adder can treat without any modification. In contrast to the above, the second addition is 13+19=32, and the sum "32" is represented by "100000" in a binary number system, which is beyond the range that a five-bit reduction adder can express. Consequently, overflow occurs, the number "1" at the most significant bit drops, and a binary number "0(00000)" is output as a result of the calculation.

This means that the calculating the sum of the data "13" of the node #2 and the data "19" of the node #3, which should correctly obtain the sum "32", results in "0" due to overflow of a higher bit. Finally, the total sum of the data is output to be 1+7+13+19=8, and the result of the calculation is wrong.

Furthermore, in an average calculation to calculate the average of data of the respective nodes in such a traditional parallel computer system, the average is obtained by dividing the total sum of the data of the respective nodes by the number of nodes.

An average calculation can be accomplished by calculation of the total sum among the nodes and then local division by the number of processes. Therefore, a software interface such as the Message Passing Interface (MPI) does not define an average for interprocess collective communication.

Dividing the total sum "40" of the data "1", "7", "13", and "19" of the nodes #0, #1, #2, and #3 illustrated in FIG. 10 by the number "four" of nodes results in 40/4=10.

In contrast, dividing a wrong result "8" of calculating the total sum due to the overflow illustrated in FIG. 11 by the number "four" of nodes results in 8/4=2, which generates an error ("8" in this example) from the correct average ("10" in the present embodiment).

In order to inhibit such a wrong calculation caused by overflow, a scheme that expands a digit bit for a carry bit each time a calculation is performed. This means that overflow is avoided by expanding one bit each time addition is carried out.

FIG. 12 is a diagram illustrating a calculation of a total sum in a traditional parallel computer system, accompanying digit-bit expansion.

In FIG. 12, occurrence of overflow is inhibited by digit-bit expansion by one bit (i.e., bit expansion) each time addition is carried out.

However, bit expansion each time a calculation is performed as the above increases the data amount to be forwarded and consumes the band.

For example, in the event of calculating the total sum of 1024 nodes, a five-bit calculation digit bit is expanded by 10 bits and consequently 15-bit packet communication is generated in a node of a subsequent stage of a reduction calculation, so that a communication band is wasted.

SUMMARY

According to an aspect of the embodiments, an information processing apparatus among a plurality of information processing apparatuses constituting a parallel computer system, the information apparatus serving as a first information processing apparatus includes circuitry configured to wait for calculation target data from each of one or more other information processing apparatuses being included in the plurality of information processing apparatus; carry out an average calculation that calculates an average value of a plurality of calculation target data including the waited calculation target data; and transmit the calculated average value to a second information processing apparatus being one of the plurality of information processing apparatuses and being different from the other information processing apparatuses.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is a diagram denoting an example of describing, in a hardware description language, a calculation operator of a parallel computer system according to an example of the embodiment;

FIG. 10 is a diagram illustrating a reduction calculation;

DESCRIPTION OF EMBODIMENT(S)

Hereinafter, an information processing apparatus, a parallel computer system, and a method for control according to an embodiment will now be detailed with reference to accompanying drawings. The following embodiment is exemplary and there is no intention to exclude various modifications and applications of techniques not explicitly referred in the first embodiment. In other words, various changes and modifications can be suggested without departing from the scope of the first embodiment. The drawings do not illustrate therein all the functions and elements included in the embodiment and may include additional functions and elements to those illustrated in the accompanying drawings.

(A) Configuration

Figure 1:
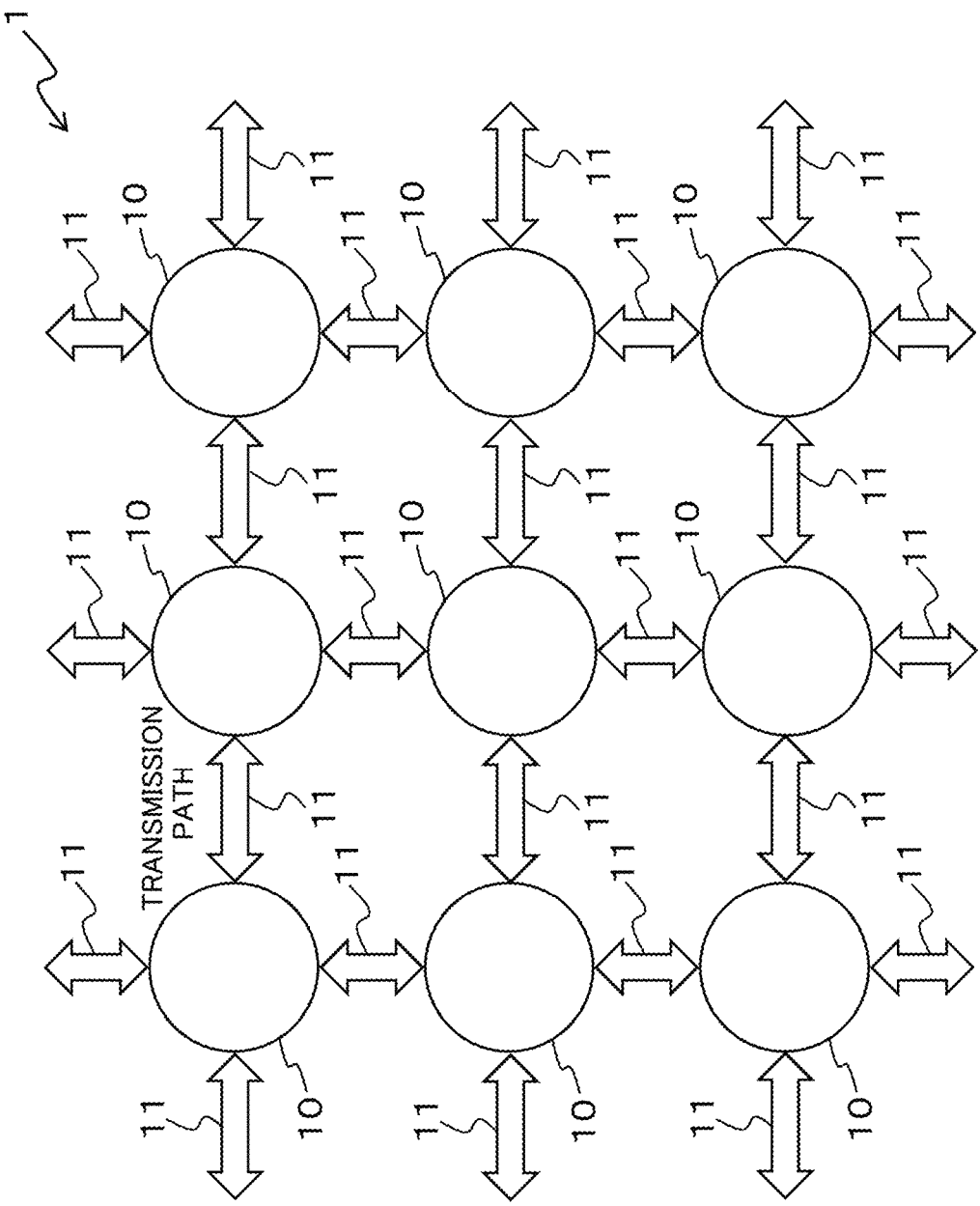
FIG. 1 is a diagram illustrating an example of the configuration of a parallel computer system according to an example of an embodiment.

FIG. 1 is a diagram illustrating an example of a parallel computer system 1 according to an example of an embodiment.

A parallel computer system 1 exemplarily illustrated in FIG. 1 forms a two-dimensional mesh network in which multiple (nine in FIG. 1) nodes 10 are connected via transmission paths 11 in a grid shape. The parallel computer system 1 is formed to be an interconnection network and arranges nodes at intersections of the grid.

A node 10 is a set of processors each serving as a unit of arranging a job in the present parallel computer system 1, and is exemplified by an information processing apparatus (computer).

Figure 2:
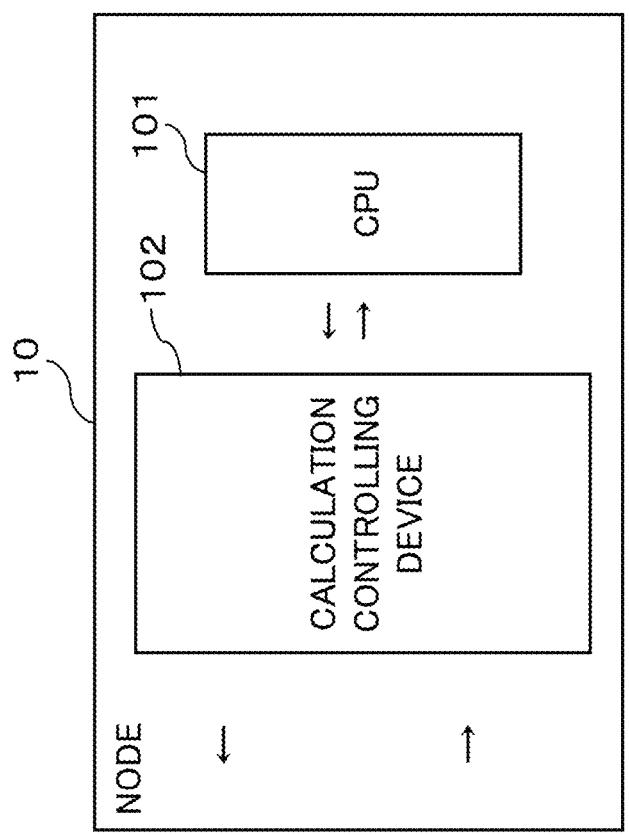
FIG. 2 is a diagram illustrating an example of the hardware configuration of a parallel computer system according to an example of the embodiment.

FIG. 2 is a diagram illustrating an example of a hardware configuration of a node 10 in the parallel computer system 1 according to an example of the embodiment.

As illustrated in FIG. 2, a node 10 includes a Central Processing Unit (CPU) 101 and a calculation controlling device 102.

The CPU 101 controls the entire node 10. The CPU 101 may be a multi-core processor provided with multiple calculation cores. The node 10 may be a multi-processor configured by being provided with multiple CPUs 101.

Alternatively, the CPU may be replaced by either one of a Micro Processing Unit (MPU), a Digital Signal Processor (DSP), an Application Specific Integrated Circuit (ASIC), a Programmable Logic Device (PLD), and a Field Programmable Gate Array (FPGA). Further alternatively, the CPU 101 may be a combination including two or more of a CPU, an MPU, a DSP, an ASIC, a PLD, and an FPGA.

The CPU 101 temporarily stores (expands) at least part of an Operating System (OS) program or application programs in a non-illustrated memory provided with the node 10, and achieves various functions by executing these programs.

The OS program, the application programs, and various pieces of data to be used for executing these programs are stored in a non-illustrated auxiliary storing device such as Hard Disk Drive (HDD), a Solid State Drive (SSD), and a Storage Class Memory (SCM).

Besides, the node 10 includes a non-illustrated network interface, which transmits and receives data to and from another node 10 or a communication device through the transmission path 11. The network interface may be an interconnection. The network interface includes a calculation controlling device 102. For example, the calculation controlling device 102 may be included in a Network Interface Card (NIC).

The calculation controlling device 102 carries out a calculation process and synchronization control. In the present parallel computer system 1, the calculation controlling device 102 carries out an average calculation and barrier-synchronization control.

Figure 3:
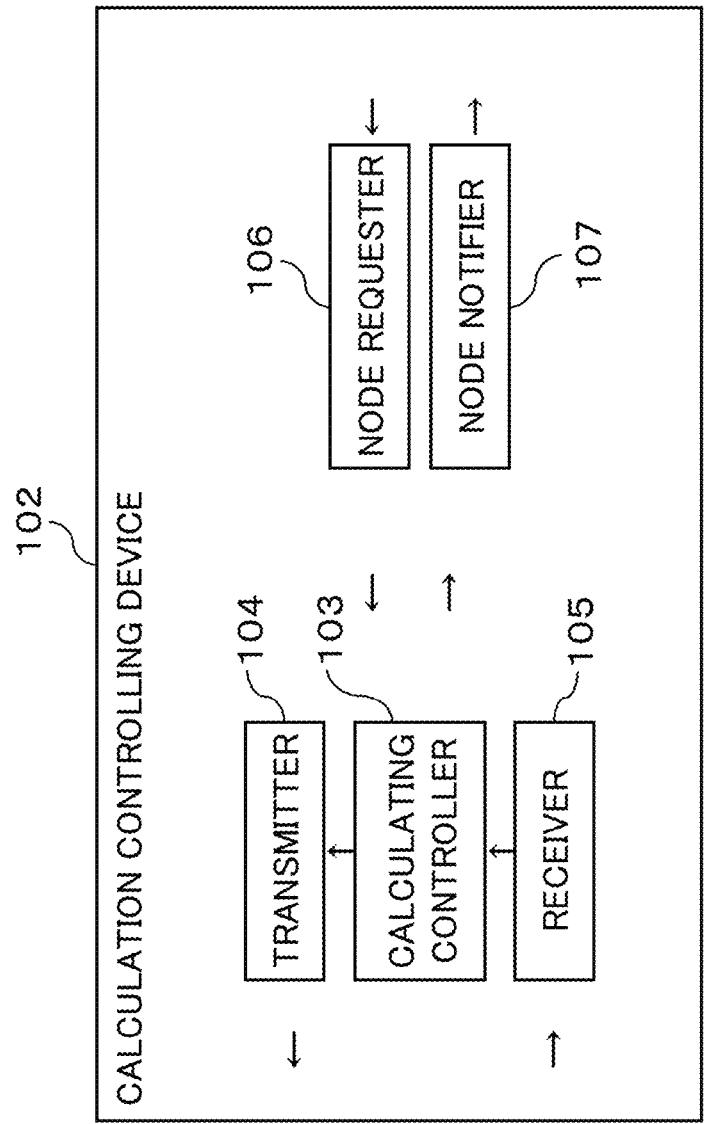
FIG. 3 is a diagram illustrating an example of the configuration of a calculation controlling device in a node of a parallel computer system according to an example of the embodiment.

FIG. 3 is a diagram illustrating the configuration of the calculation controlling device 102 in a node 10 of the parallel computer system 1 according to an example of the present embodiment.

As illustrated in FIG. 3, the calculation controlling device 102 includes a calculating controller 103, a transmitter 104, a receiver 105, a node requester 106, and a node notifier 107.

The transmitter 104 and the receiver 105 transmit and receive data or other information to and from another node 10 (hereinafter sometimes referred to as "another node 10") connected to the node 10 (hereinafter sometimes referred to as "own node 10") provided with the calculation controlling device 102 in question through the transmission path 11.

The transmitter 104 transmits data or other information, in the form of a packet, to another node 10. The receiver 105 receives data or other information, in the form of a packet, from another node 10.

The node requester 106 and the node notifier 107 transmit and receive data and other information to and from the CPU 101 provided with the own node 10.

The node requester 106 receives a calculation instruction, data, and other information, in the form of a packet, from the CPU 101 of the own node 10. The node notifier 107 transmits a result of a calculation, data, and other information, in the form of a packet, to the CPU 101 of the own node 10.

The calculating controller 103 carries out a calculation process and a synchronization process.

Figure 4:
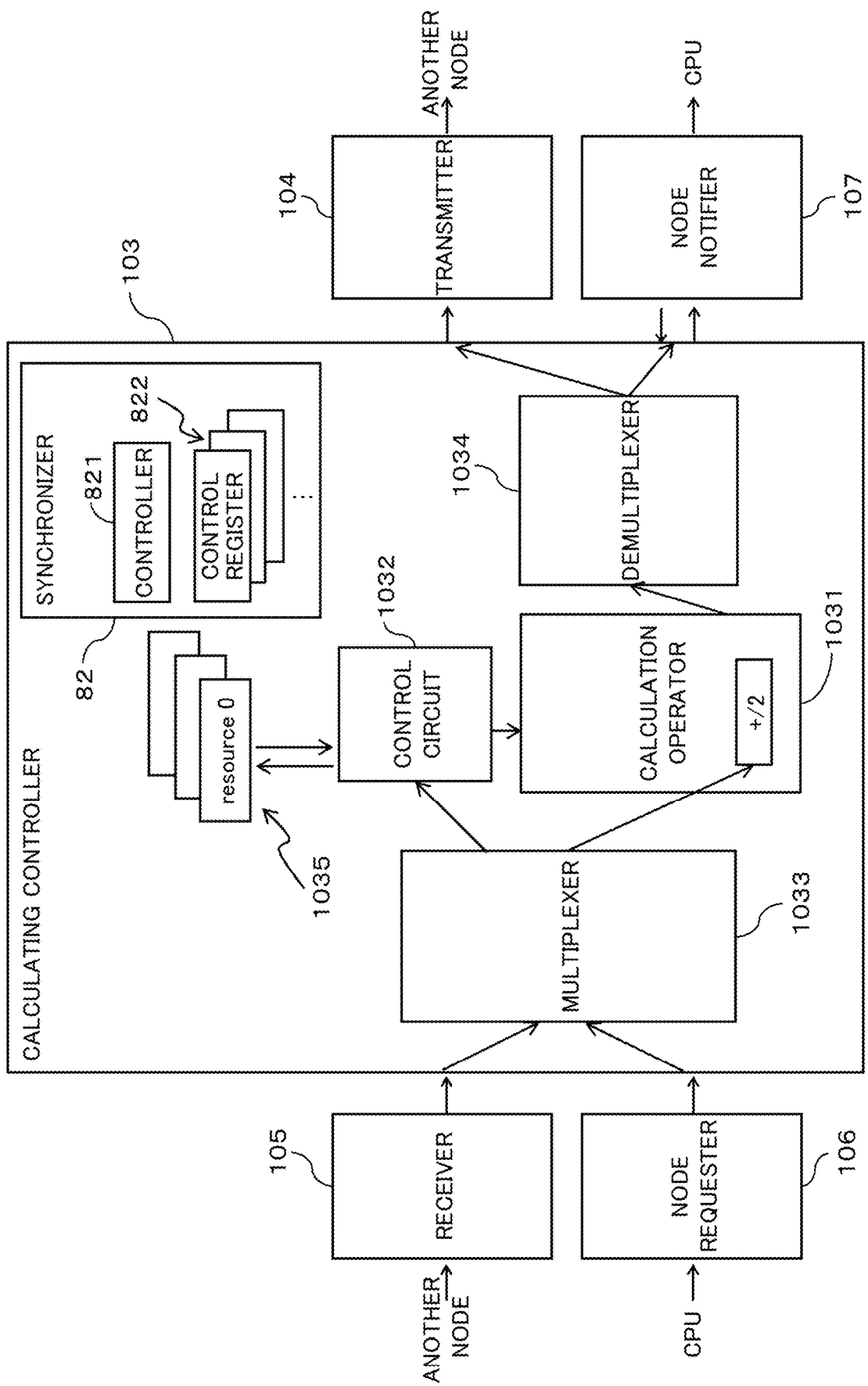
FIG. 4 is a diagram illustrating an example of a calculating controller in a node of a parallel computer system according to an example of the embodiment.

FIG. 4 is a diagram illustrating an example of the configuration of the calculating controller 103 of the node 10 of the parallel computer system 1 according to an example of the present embodiment.

As illustrated in FIG. 4, the calculating controller 103 includes a calculation operator 1031, a control circuit 1032, a multiplexer (MUX) 1033, a demultiplexer (DEMUX) 1034, calculation resources 1035, and a synchronizer 82.

The calculating controller 103 carries out an average calculation, performing barrier synchronization by means of the butterfly.

The first target data of an average calculation is input from the CPU 101 via the node requester 106 finally into the multiplexer 1033. The second target data of the average calculation is input, in the form of a packet, from the transmission path 11 via the receiver 105 finally into the multiplexer 1033.

In contrast, a result of an average calculation is output from the demultiplexer 1034 via the node notifier 107 to the CPU 101. The result of the average calculation is also output from the demultiplexer 1034 to the transmitter 104, which then transmits the result, in the form of a packet, to the transmission path 11. Thereby, the result of the average calculation is transmitted to another node 10 connected to the transmission path 11.

To accomplish an average calculation, the CPU 101 may set, in the calculating controller 103, a destination of transmitting a first synchronization signal and a destination of transmitting a second synchronization signal from the calculating controller 103 in accordance with a setting condition input from a non-illustrated IO (Input-Output) device such as a keyboard.

Furthermore, the CPU 101 transmits calculation target data to the calculation controlling device 102 at the start of the average calculation, and receives a result of an average calculation from the calculation controlling device 102. The calculation controlling device 102 communicates with the calculation controlling device 102 of another node 10 via the transmission path 11 as the above, and performs an average calculation based on the communication.

To accomplish the average calculation, after the synchronization is established, the synchronizer 82 included in the calculation controlling device 102 instructs the transmitter 104 to transmit a second synchronization signal and also instructs the control circuit 1032 to carry out a predetermined average calculation. When receiving the instruction to transmit a second synchronization signal, the node notifier 107 transmits the result of the average calculation carried out in the calculation operator 1031 along with the second synchronization signal to the CPU 101.

The synchronizer 82 communicates with the synchronizer 82 of another node 10 via the transmission path 11 in conformity with a setting condition, and carries out barrier synchronization based on the communication. This means that the synchronizer 82 corresponds to awaiting processor that waits for calculation target data from another node 10.

Each of multiple jobs performing the barrier synchronization stops process thereof when reaching a point where the process is to be synchronized, i.e., the barrier point. In other words, when each of the multiple jobs reaches the barrier point, the job waits until the remaining jobs reach the barrier point. At the time point when all the multiple jobs performing barrier synchronization reach the barrier point, which means that the barrier synchronization is successfully established, the multiple jobs resume their respective stopped processes. This makes it possible to synchronize parallel jobs among multiple jobs being executed in parallel.

One of the algorithms to achieve the above barrier synchronization is the butterfly calculation, which can be abbreviated to the "butterfly". In the butterfly, a process is divided into multiple stages and communicates with another process using a signal in each stage. In this example, the butterfly can be used as the algorithm of the barrier synchronization.

In the synchronizer 82, each control register 822 is provided with a type register. The type register may store information representing a type of calculation for controlling an average calculation to be performed in the calculation operator 1031. The information to be stored in the type register may be, as a part of the setting condition, input from a non-illustrated IO (Input-Output) device.

Here, brief description will now be made in relation to an average calculation. An average calculation can be accomplished by using the same algorithm as the barrier synchronization. In other words, an average calculation can be accomplished by a butterfly network that accomplishes the barrier synchronization by means of the butterfly.

Accordingly, an average divides a job into multiple stages and each process communicates with another job using a signal in each stage. In cases where a single job operates on a single node 10, the job can be regarded as the same as the node 10. The process and the transmission destination of the job of each stage are basically the same as those of the barrier synchronization.

At the first stage #1 of an average calculation, each job transmits calculation target data to the job of the next stage #2. At the stage #2, upon receipt of data from the jobs of the previous stage #1, each job of the second stage #2 adds the received data to the data that the job holds and transmits the result of the calculation to the jobs of the next stage #3. At the final stage #3, upon receipt of data from the jobs of the previous stage #2, each job carries out an average calculation on the received data and the result of the calculation by the own job at the previous stage #2. The result of the average calculation at the sage #3 is the result of a collective average calculation.

An average calculation is carried out in the following example scheme.

The CPU 101 sets destination node addresses of a next stage, the control register numbers, and other information based on the setting condition in the control registers 822 of each target pair of an average calculation. After that, the CPU 101 transmits input data and an average synchronization start signal to the calculation controlling device 102. Thereby, the calculation controlling device 102 (calculating controller 103) starts an average calculation. In cases where synchronization is established in control registers 822 associated with the final stage, the calculation controlling device 102 transmits the result of the calculation and a signal representing completion of the average calculation to the CPU 101.

The receiver 105 receives a packet from another node 10 through the transmission path 11, transmits a combination of a synchronization signal and a destination based on the received packet to the synchronizer 82, and transmits data received in the form of a packet to the calculating controller 103.

In the calculating controller 103, data is input, as "read data", through the multiplexer 1033 into the calculation operator 1031. The data from the CPU 101 is input at the start of an average calculation, for example.

The data being undergoing an average calculation is stored in a non-illustrated storing device. This means that the storing device retains the data being undergoing an average calculation. The storing capacity of the storing device is a product of the number of control registers 822 and the number of bits of data, for example. The address of the storing device, which is to store the data being undergoing an average calculation, is assigned by a writing address from the control circuit 1032. The writing address of the storing device corresponds to the control register 822 to be used for the average calculation and is generated on the basis of the control register number of the same control register 822.

The data being undergoing an average calculation and being stored in the storing device is read by assigning the reading address from the control circuit 1032 and then input into the calculation operator 1031. The reading address of the storing device corresponds to the control register 822 to be used for the average calculation and is generated on the basis of the control register number of the same control register 822.

The controller 821 of the synchronizer 82 refers to the value (Destination) of a destination register of the control register 822, and in cases where another node 10 is assigned in the destination register, transmits a signal instructing packet transmission to the transmitter 104, and transmits data to the transmitter 104. The data to be transmitted to the transmitter 104 is the value of an input data register if the control register 822 is at the first stage, or the result of the calculation from the calculation operator 1031 if the control register 822 is at a subsequent stage. In transmitting the value of the input data register to the transmitter 104, the controller 821 assigns a bypass as a calculation instruction.

In contrast, the destination register assigns the own job or the control register 822 of the own node, the controller 821 reads the value (Signal) of a signal register of the control register 822 assigned by the destination register in order to transmit a synchronization signal to the own job or the synchronizer 82 of the own node.

In cases where information (e.g., representing that synchronization is established is not set in the signal register, the controller 821 sets "1" in the signal register and stores the data into an address corresponding to the control register 822 of the storing device. The data is the value of an input data register if the control register 822 is at the first stage, and the result of the calculation from the previous stage if the control register 822 is at a subsequent stage.

The multiplexer 1033 selects one of data from the receiver 105 and data from the node requester 106 in accordance with an instruction to select an input unit from the control circuit 1032 and inputs the selected data into the control circuit 1032 or the calculation operator 1031. For example, in cases where the synchronization signal and the destination are input from the receiver 105, the instruction to select an input unit may output the data of the receiver 105 to the multiplexer 1033, while in cases except for the above, the instruction to select an input unit may output data from the node requester 106 to the multiplexer 1033.

The calculation operator 1031 carries out an average calculation on data waited by the storing device and either one of data from a packet input through the multiplexer 1033 and the result of the previous calculation. This means that in cases where the calculation operator 1031 receives the instruction from the control circuit 1032, the calculation operator 1031 carries out an average calculation using data stored in the storing device. Specifically, the calculation operator 1031 carries out an average calculation in accordance with a calculation instruction from the control circuit 1032, and inputs the result of the average calculation into the demultiplexer 1034.

The calculation operator 1031 carries out an average calculation on, for example, the data input from the storing device, i.e., first data, and one of data from a packet received by the receiver 105 or the result of a calculation that the calculation operator 1031 carried out at the previous stage, i.e., second data.

The calculating controller 103 achieves the average calculation by adding $2^{\wedge}n$ calculation target data (calculation pairs) and extracting higher bits from the sum through an n-bit shift that removes the n lower bits. Here, the symbol "n" represents a natural number of one or more.

Specifically, the calculating controller 103 carries out an average calculation of large-scale nodes by dividing the nodes into $2^{\wedge}n$ groups and repeating a calculation on each group, and carrying out a further calculation on a group newly constituted at the next stage, and consequently an average value of the entire nodes 10 is finally calculated. The calculation operator 1031 corresponds to a calculation processor that carries out an average calculation that calculates at average value of a plurality of calculation target data including the waited calculation target data.

Hereinafter, description will now made on an example when n=1. In this case, the calculating controller 103 has a function for waiting for two packets and outputting the two packets.

Waiting for a packet can be achieved by various known schemes such as barrier synchronization by means of the butterfly.

The calculation resource 1035 is intermediate data being undergoing group definition or waiting, for example.

Under a setting of waiting for two packets, the calculation operator 1031 carries out calculation, and under a setting of not waiting for two packets, the packets are forwarded without modifying the packets.

Identification (ID) is embedded in a packet, and therefore the calculating controller 103 can recognize a pair of packets to be calculated in combination with each other.

In cases where no antecedent packet is present, a packet transmitted from the receiver 105 is stored as it is and waits for a counterpart packet. In contrast, in cases where an antecedent packet serving to the packet received from the receiver 105 is present, a packet transmitted from the receiver 105 are subjected to an average calculation along with the antecedent counterpart packet.

The result of the average calculation is forwarded to the transmitter 104 and further forwarded to the calculating controller 103 of another node 10, i.e., the subsequent stage. In cases where the final result is obtained, the node notifier 107 notifies the CPU 101 of the obtaining of the result, and terminates the process.

Figure 5:
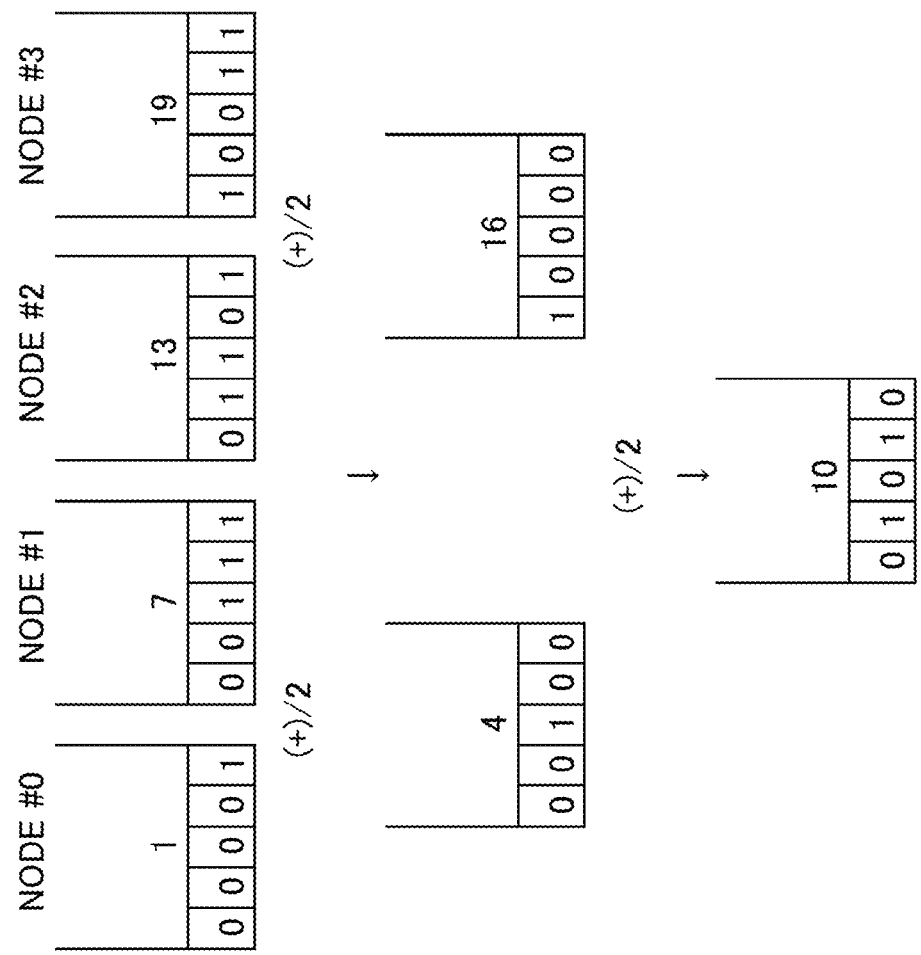
FIG. 5 is a diagram illustrating an average calculation in a parallel computer system according to an example of the embodiment.

FIG. 5 is a diagram illustrating an average calculation in the parallel computer system 1 according to an example of the present embodiment.

In the example of FIG. 5, the calculation operators 1031 of the nodes #0-#3 are five-bit operators, and the nodes #0, #1, #2, and #3 have the data "1", "7", "13", and "19", respectively.

In relation to the notation of the nodes #0, #1, #2, and #3, the numeric numbers subsequent to the symbol # represent node identification numbers that identify individual nodes 10.

The parallel computer system 1 calculates an average value (midway average value) "4" by calculating (1+7)/2 using the data "1" of the node #0 and the data "7" of the node #1. Likewise, the parallel computer system 1 calculates an average value (midway average value) "16" by calculating (13+19)/2 using the data "13" of the node #2 and the data "19" of the node #3.

After that, the average value "10" is obtained by calculating (4+16)/2 using these midway average values "4" and "16".

This means that the average of the data "1", "7", "13", and "19" of the nodes #0, #1, #2, and #3 is calculated by the expression ((1+7)/2+(13+19)/2)/2.

In calculating a midway average value and an average value, the calculation operator 1031 achieves division by omitting lower bits through n-bit shift on the sum of $2^{\wedge}n$ calculation pairs of data.

In the present embodiment, division by two is achieved by omitting the least significant bit through one-bit shift on the sum of two data represented in the five-bit binary number system.

In the example of FIG. 5, a midway average value "4(00100)" is calculated by omitting the least significant bit "0" through one-bit shift on the sum "8(01000)" of "1(00001)" and "7(00111)".

Likewise, a midway average value "16(10000)" is calculated by omitting the least significant bit "0" through one-bit shift on the sum "32 (100000)" of "13 (01101)" and "19 (10011)".

For the last, the average value "10(01010)" is calculated by omitting the least significant bit "0" through one-bit shift on the sum "20 (010100" of "4(00100)" and "16(10000)". Consequently, an average value can be obtained by calculating (4+16)/2=10.

The average calculation performed in the parallel computer system 1 can eliminate the requirement for bit expansion each time a calculation is carried out at each stage, which does not increase the required bit number to match the calculation scale. Consequently, the band for packet communication between the nodes 10 is not wasted.

In cases where the sum of two data is an odd number, such as the calculation (1+8), the least significant bit drops through one-bit shift and consequently perfect precision is not ensured. However, dropping the least significant bit caused by one-bit shift has an error remarkably smaller than dropping higher bits due to overflow. In cases of n=1, for example, the result of calculation can be ensured to the error of have 0.5 or less. Besides, dropping the least significant bit can fulfill a demand for a calculation not requiring high precision but needs to save hardware resources as much as possible.

FIG. 6 is a diagram denoting an example of expressing the calculation operator 1031 in hardware describing language in the parallel computer system 1 according to an example of the present embodiment.

The calculation circuit exemplarily described in FIG. 6 ensures a five-bit average operation and has a six-bit adder (work[5:0]). This six-bit adder adds two five-bit inputs (input A, input B) (see symbol P1). Then, one-bit shift is accomplished by extracting the five higher bits from the result of the calculation carried out by the adder and forwards only the five extracted bits to the next stage (see symbol P2).

In the example of FIG. 6, the description assumes an integer without a sign, but the present embodiment is not limited to this. Alternatively, the description can implement an integer with a sign, for example.

The demultiplexer 1034 outputs the input from the calculation operator 1031 to the transmitter 104 or the node notifier 107.

The demultiplexer 1034 may select an output destination in accordance of an instruction to select an output device from the control circuit 1032 and others. The instruction to select an output device may cause the data from the calculation operator 1031 to be output to the transmitter 104 before the completion of the average calculation and to the node notifier 107 except for the above case.

The node notifier 107 outputs the result of the average calculation (average value, midway average value) to the CPU 101. The result of the average calculation output from the node notifier 107 is input into the CPU 101 when the average calculation is completed.

In cases where the transmitter 104 receives a result of calculation, a destination node address assigned by a packet transmission instruction, and a control register number from the demultiplexer 1034 of the calculating controller 103, the transmitter 104 generates a packet based on the received information and transmits the generated packet to the transmission path 11.

For example, the control circuit 1032 may carry out a process to change the transmission destination of a midway average value, which is an intermediate result of a calculation, for each stage. When receiving a synchronization signal and a control register number from the receiver 105, the control circuit 1032 may transmit a synchronization signal to a control register corresponding to the received control register number.

When the synchronization is established, the control circuit 1032 outputs an instruction to transmit a synchronization signal to the transmitter 104. The control circuit 1032 transmits a synchronization signal to the own job and a designated control register in the own node 10, and additionally controls the calculation operator 1031. This means that the control circuit 1032 carries out an average calculation on data stored in the calculation operator 1031 and the data being waited in the storing device. In contrast, when the synchronization is not established, the control circuit 1032 stores the data into the storing device.

When synchronization is established in cases where the control circuit 1032 transmits a synchronization signal to the own job and a designated control register in the own node 10, the control circuit 1032 further controls the calculation operator 1031 to repeat an average calculation with the result of the calculation and data waited in the storing device. In contrast, if synchronization is not established, the control circuit 1032 transmits the result of the calculation to the storing device.

Upon receipt of a signal of starting an average calculation, the control circuit 1032 transmits the synchronization signal and the input data to the transmission destination of the assigned combination, i.e., the control register. In cases where synchronization is established in the last combination, the control circuit 1032 transmits the result of the calculation and a signal representing completion of the average calculation to the CPU 101.

Figure 7:
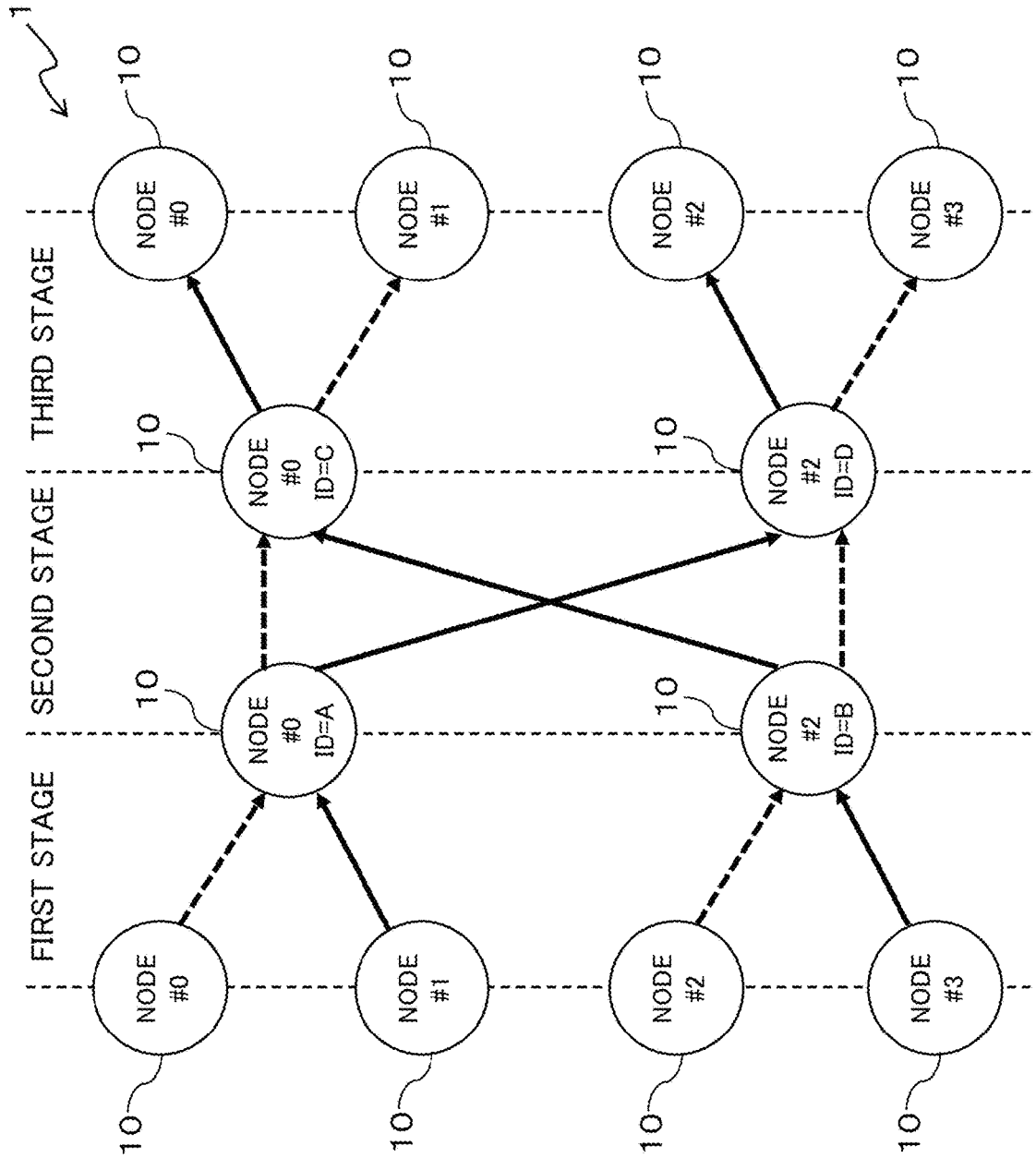
FIG. 7 is a diagram illustrating an example of a process of an average calculation in a parallel computer system according to an example of the embodiment.

(B) Operation:

FIG. 7 is a diagram illustrating an example of processing of an average calculation in the parallel computer system 1 according to an example of the present embodiment.

In the example of FIG. 7, the process of an average calculation is illustrated being divided into a first stage, a second stage, and the third stage. Among multiple nodes #0-#3, the nodes #0 and #2, which have even node identification numbers, carry out average calculation.

At the first stage, the node #0 and the node #1 put ID=A on packets and transmit the packets to the interconnection of the node #0. In the node #0, the calculation operator 1031 carries out an average calculation using the data of the node #0 and the data of the node #1 that are attached thereto the ID=A.

The node #2 and the node #3 put ID=B on packets and transmit the packets to the interconnection of the node #2. In the node #2, the calculation operator 1031 carries out an average calculation using the data of the node #2 and the data of the node #3 that are attached thereto the ID=B.

At the second stage, the node #0 and the node #2 put ID=C on packets and transmit the packets to the interconnection of the node #0. In the node #0, the calculation operator 1031 carries out an average calculation using the data from the node #2 and the data of the node #0 attached thereto the ID=C.

The node #0 and the node #2 put ID=D on packets and transmit the packets to the interconnection of the node #2. In the node #2, the calculation operator 1031 carries out an average calculation using the data from the node #0 and the data of the node #2 attached thereto the ID=D.

At the third stage, the node if π0 returns the result of the calculation by transmitting packets to the node #0 and the node #1. The node #2 returns the result of the calculation by transmitting packets to the node #2 and the node #3.

Figure 8:
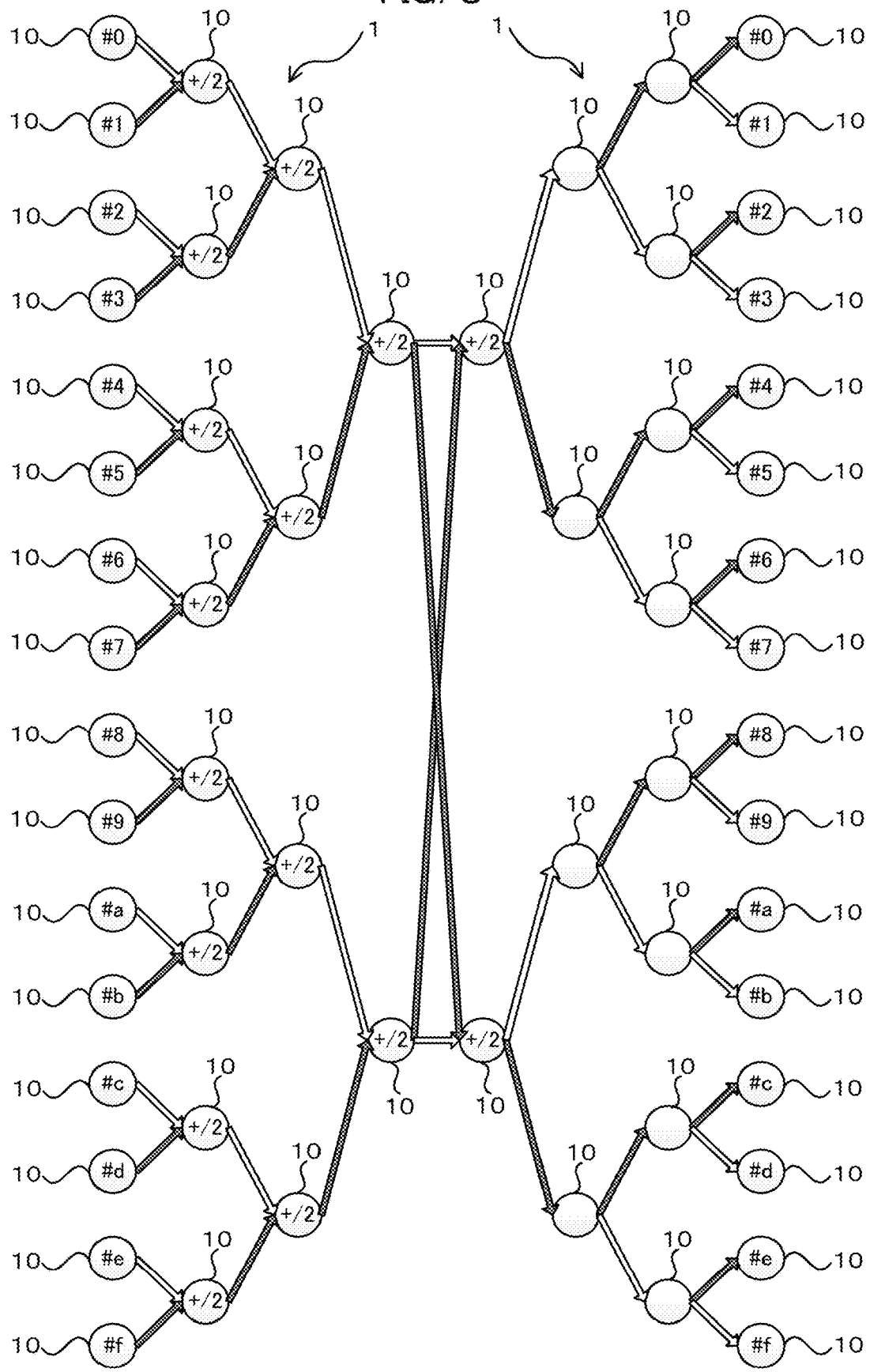
FIG. 8 is a diagram illustrating an example of a process tree of a parallel computer system according to an example of the embodiment.

FIG. 8 is a diagram illustrating an example of a process tree of the parallel computer system 1 according to an example of the present embodiment. The parallel computer system 1 exemplarily illustrated in FIG. 8 includes 16 nodes #0 to #f. In the parallel computer system 1, an average value (midway average value) of two adjacent nodes 10 is calculated and transmitted, and consequently an overall average value (collective average calculation) is calculated and transmitted to all the node 10. The white circles in FIG. 8 represent nodes.

Next, description will now be made in relation to a process of an average calculation performed by the calculating controller 103 of the parallel computer system according to an example of the present embodiment having the above configuration with reference to the flow diagram (Steps S1-S13) in FIG. 9.

Figure 9:
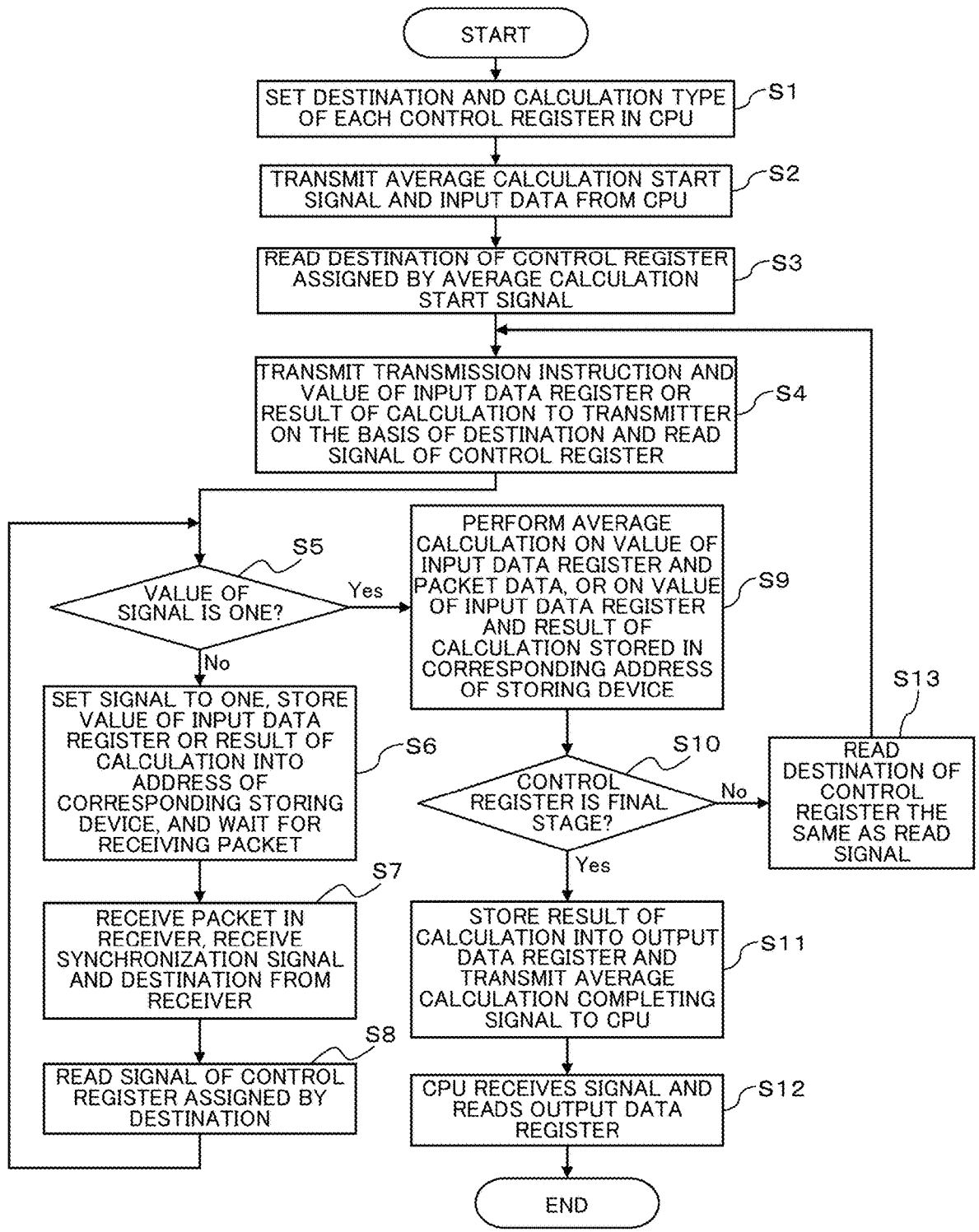
FIG. 9 is a diagram illustrating an example of a process flow of a reduction calculation process in a calculating controller of a parallel computer system according to an example of the embodiment.
Figure 11:
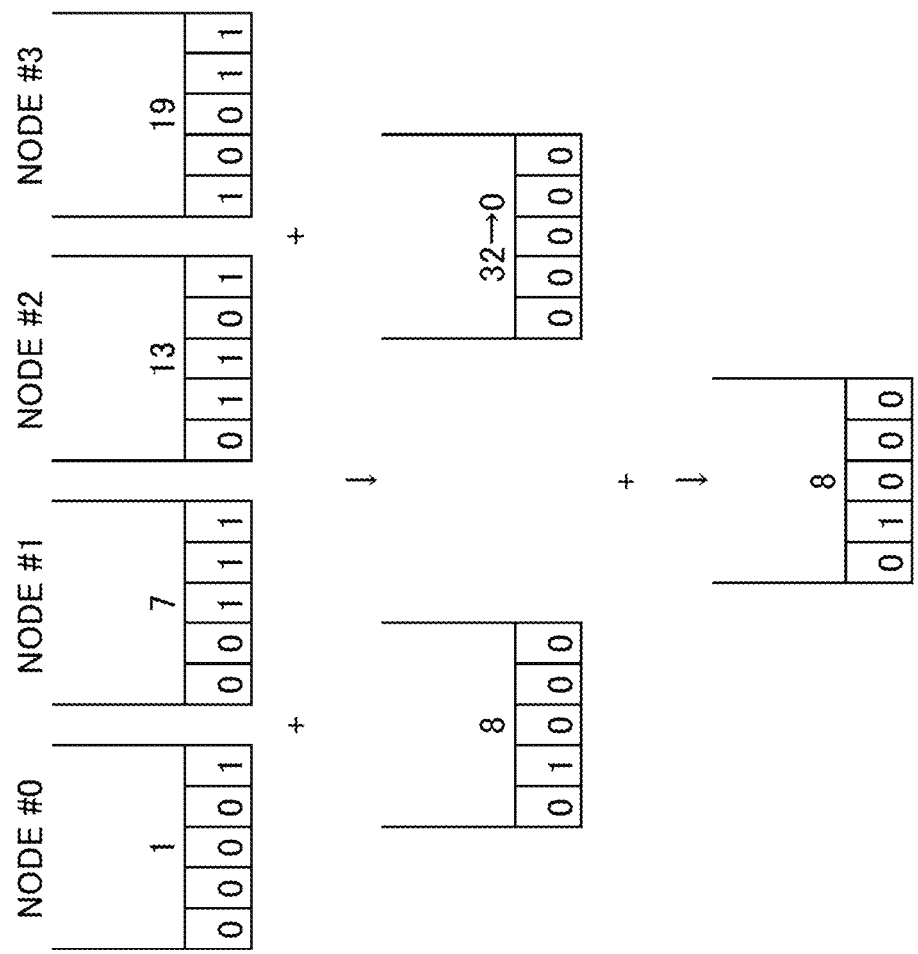
FIG. 11 is a diagram illustrating a total-sum calculation performed in a traditional parallel computer system.
Figure 12:
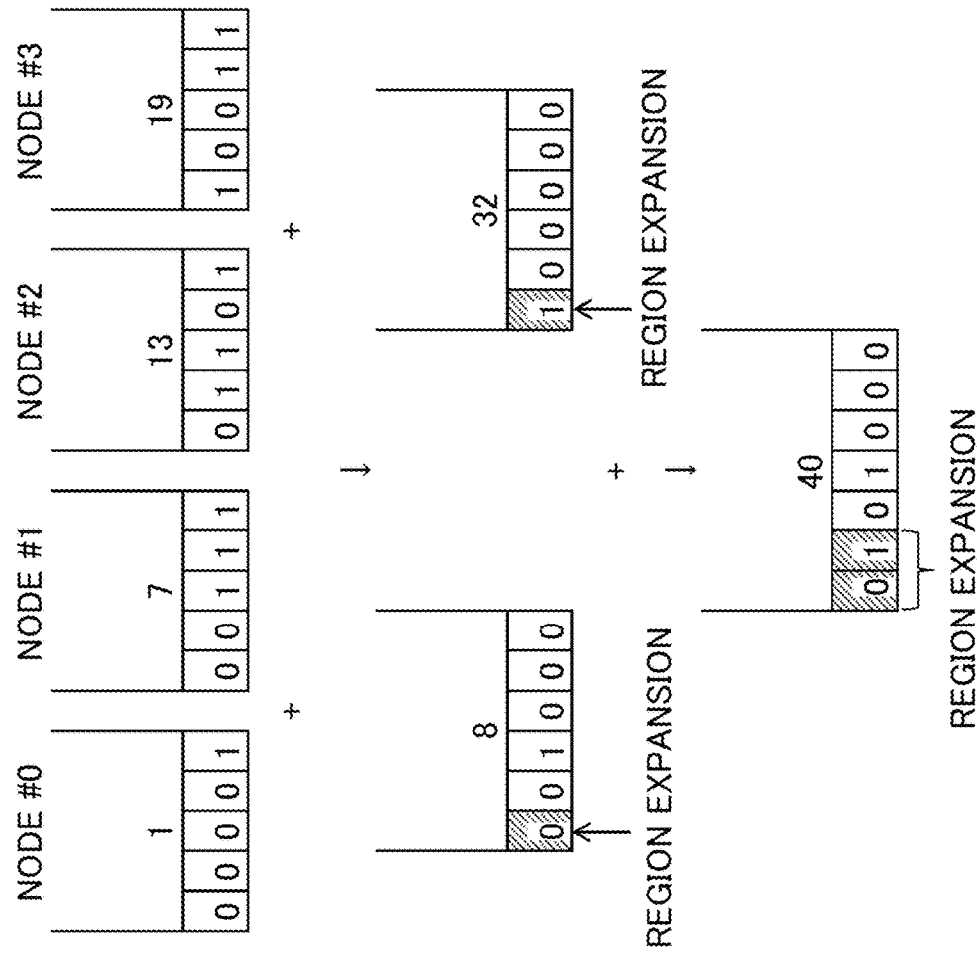
FIG. 12 is a diagram illustrating a total-sum calculation that accompanies digit-bit expansion in a traditional parallel computer system.

The example of FIG. 9 assumes that the average calculation is accomplished by barrier synchronization by means of the butterfly.

Before starting the average calculation, the CPU 101 determines the number of control registers 822 to be used on the basis of the number of nodes target for the average calculation, and sets a destination node address and a control register number associated with the next stage of the butterfly in the destination register of each control register 822 and sets the calculation type in the type register of each control register 822 (Step S1).

The setting of each register is determined in the following manner. In cases where the number of nodes is powers of two, the scheme of the butterfly transmits a synchronization signal to two points of either one of the next stage of the own job or the next stage of the own node and the next stage of another node after the synchronization is established. Accordingly, the destination to be assigned to the destination register includes the control register number of the own job or the own nodes and a destination node address and the control register number of another node. At the first stage, a signal register is not used because there is no need to wait a signal, and at the final stage, a destination register is not used. For the above, the same control register 822 is assigned at the first and the final stages.

In cases where the number of nodes is not power of two, a control register 822 that is to serve as a relay stage of an additional node is set in another node, i.e., an additional node. In the additional node, the control register 822 of the first stage and the control register 822 of the final stage are set not to communicate with each other. Furthermore, the type register of the control register 822 of the additional node is set to pass over (bypass) so that the additional node is set to be prohibited from carrying out a calculation.

For starting the average calculation, the CPU 101 transmits input data to a input data register, and transmits an average calculation start signal to the synchronizer (Step S2). The average calculation start signal includes an input register number and a control register number associated with the first stage.

Upon receipt of the average calculation start signal, the controller 821 of the synchronizer 82 reads the value (Destination) of a destination register of the control register 822 assigned by the average calculation start signal (Step S3).

In cases where another node 10 is assigned by the destination register, the controller 821 transmits a signal instructing packet transmission to the transmitter 104 and transmits the data to the transmitter 104. The data to be transmitted to the transmitter 104 is the value of an input data register if the control register 822 is at the first stage, and the result of the calculation from the calculation operator 1031 if the control register 822 is at a subsequent stage. In transmitting the value of the input data register to the transmitter 104, the controller 821 assigns a bypass as a calculation instruction. The transmitter 104 generates a packet on the basis of a destination node address and a control register number assigned by a packet transmission instruction, and transmits the generated packet to the transmission path 11.

In contrast, the destination register assigns the own job or the control register 822 of the own node, the controller 821 reads the value (Signal) of a signal register of the control register 822 assigned by the destination register to transmit a synchronization signal to the own job and the synchronizer 82 of the own node (Step S4).

The controller 821 checks whether a value "1" is set in the signal register (Step S5). In cases where a value "1" is set in the signal register (see Yes rout of Step S5), synchronization is established. On the other hand, in cases where a value "1" is not set in the signal register (see No route of Step S5), synchronization is not established.

In cases where synchronization is not established, the controller 821 sets the value "1" in the signal register and stores the data into an address corresponding to the control register 822 of the storing device. In cases where the control register 822 is at the first stage, the data is the value of an input data register, while in cases where the control register 822 is at a subsequent stage, the data is a result of the calculation of the previous stage. After that, the controller 821 waits for receiving a packet from another job (Step S6)

If receiving a packet from another job, the receiver 105 extracts the data, the synchronization signal, and the control register number to be regarded as the destination on the basis of the received packet, and transmit the extracted information to the multiplexer 1033 and the synchronizer 82 (Step S7).

Upon receipt of the synchronization signal and the control register number from the receiver 105, the synchronizer 82 reads the value of Signal of the assigned control register 822 (Step S8). After that, the process of Step S5 and the subsequent to Step S5 are repeated.

In contrast to the above, synchronization is established in Step S5 (see Yes route of Step S5), the calculation operator 1031 carries out an average calculation (Step S9). In cases where the control register 822 is associated with the next stage to the first stage, the calculation target data is α value of the input data register. In contrast, in cases where the control register 822 is associated with a subsequent stage to the above and also the synchronization is established by the synchronization signal based on the packet, the calculation target data is the data included in the packet. In cases where the received synchronization signal is a synchronization signal from the own job or the synchronization device of the own node 10, the calculation is performed on the result of the calculation at the previous stage and the data to be stored in an address of the storing device corresponding to a control register 822 that has established the synchronization. In cases where the received information is a result of the calculation, the type of the calculation is assigned on the basis of the value of the type register.

Furthermore, the controller 821 checks whether the control register is associated with the final stage (Step S10).

In cases where a control register 822 associated with the final stage has established the synchronization (see Yes route of Step S10), the controller 821 stores the result of the calculation into the output data register and transmits a signal representing completion of the average calculation to the CPU 101 (Step S11).

The CPU 101 receives the signal representing completion of the average calculation from the controller 821, and reads the result of the calculation from the output data register (Step S12).

In Step S10, in cases where the control register 822 is not associated with the final stage (see No route of Step S10), the CPU 101 reads the value of the destination register of the control register 822 that has established the synchronization (Step S13). Then, the process of Step S4 and subsequent thereto are repeated.

(C) Effects:

As described above, in performing a collective average calculation in the parallel computer system 1 of an example of the present embodiment, the calculation operator 1031 of each node 10 calculates an average value (midway average value) by carrying out a n-bit shift after addition of $2/\wedge n$ elements at each stage.

For example, in cases where n=1, the average value (midway average value) is calculated by summing process target data of two nodes 10 and then carrying out a one-bit shift on the sum (binary number system).

Since this reduces the number of bits of data to be forwarded to the next stage, the average value can be calculated without bit expansion so that a correct midway calculated value can be transmitted to the next stage. Consequently, a highly-precise collective average calculation can be achieved, not requiring bit expansion.

Furthermore, this makes it possible to offload the collective average calculation to an interconnection without bothering about overflow.

(D) Miscellaneous:

In the above embodiment, the function of the calculation operator 1031 may be achieved by a processor being mounted on an NIC and performing a program. For example, the function of the calculation operator 1031 may be achieved by a process being mounted on an NIC and executing a program described in a hardware description language exemplarily denoted in FIG. 6.

The program (calculation control program) to achieve the function as the calculation operator 1031 may be provided in the form of being stored in a non-transitory computer-readable recording medium exemplified by a flexible disk, a CD (e.g., CD-ROM, CD-R, CD-RW), a DVD (e.g., DVD-ROM, DVD-RAM, DVD-R, DVD+R, DVD-RW, DVD+RW, and HD DVD), a Blu-ray disk, a magnetic disk, an optical disk, and a magneto-optical disk. A computer reads the program from the recording medium using the medium reader and stores the read program in an internal or external storage device for future use. Alternatively, the program may be recorded in a recording device (recording medium) such as a magnetic disk, an optical disk, or a magneto-optical disk, and may be provided from the recording device to the computer via a communication path.

The function as the calculation operator 1031 is achieved by a microprocessor (in the present embodiment, a processor mounted on the NIC) of a computer executing a program stored in an internal storing device (e.g., a memory mounted on the NIC). For this purpose, the computer may read the program stored in a recording medium and execute the read program.

A processor controls the function of the NIC. The processor may be a multi-processor. The processor may be one of a Central Processing Unit (CPU), a Micro Processing Unit (MPU), a Digital Signal Processor (DSP), an Application Specific Integrated Circuit (ASIC), a Programmable Logic Device (PLD), and a Field Programmable Gate Array (FPGA). Furthermore, the processor may be a combination of two or more of a CPU, an MPU, a DSP, an ASIC, a PLD, and an FPGA.

A circuit device that achieves the function as the calculation operator 1031 may be provided to the NIC and is therefore achieved by means of hardware.

The technique disclosed herein is not limited to the foregoing embodiment and can be variously modified without departing from the scope of the present embodiment. The respective configurations and the respective processes of the present embodiment may be selected or omitted according to the requirement or may be appropriately combined.

For example, the foregoing embodiment describes a case where n=1 as an example that carries out n-bit shift for an average calculation of $2/\wedge n$ calculation target data, but is not limited to this. This means that the value n may be a value except for one and may be variously changed.

For example, when n=2, the calculation operator 1031 may carry out an average calculation by performing two-bit shift that removes the two lower bits after addition of data of four nodes 10, and finally obtaining higher bits.

Furthermore, the foregoing embodiment assumes a case where the calculation controlling device 102 is provided to the NIC of the node 10. However, the structure of the calculation controlling device 102 is not limited to this and various changes and modification can be suggested.

Alternatively, the function of the calculation controlling device 102 may be provided to a network relay apparatus, such as a switch, to which the node 10 is connected.

Those ordinary skilled in the art can carry out and manufacture the embodiment with reference to the above disclosure.

According to the foregoing embodiment, a collective average calculation can be precisely achieved without requiring bit expansion.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An information processing apparatus among a plurality of information processing apparatuses constituting a parallel computer system, the information apparatus serving as a first information processing apparatus comprising
a network interface card configured to:
wait for calculation target data from each of one or more other information processing apparatuses being included in the plurality of information processing apparatus;
carry out an average calculation that calculates an average value of a plurality of calculation target data including the waited calculation target data without requiring bit expansion, using a butterfly network, the butterfly network accomplishing barrier synchronization by means of a butterfly; and
transmit the calculated average value to a second information processing apparatus being one of the plurality of information processing apparatuses and being different from the other information processing apparatuses.

2. The information processing apparatus according to claim 1, wherein the waited calculation target data from each of the one or more other information processing apparatuses is the average value calculated in the other information processing apparatus.

3. The information processing apparatus according to claim 1, wherein the transmitted average value is used as the calculation target data in the second information processing apparatus.

4. The information processing apparatus according to claim 1, wherein the circuitry carries out the average calculation by adding $2/\wedge n$ of the calculation target data and extracting higher bits from a sum obtained by the adding through n-bit shift that removes n lower bits.

5. The information processing apparatus according to claim 1, further comprising at least one processor and at least one transmitter, wherein
the processor waits for the calculation target data and carries out the average calculation, and
the transmitter transmits the calculated average value to the second information processing apparatus.

6. The information processing apparatus according to claim 1, further comprising a first processor and a second processor, wherein
the first processor waits for the calculation target data and the second processor carries out the average calculation.

7. A parallel computer system comprising a plurality of information processing apparatuses, a first information processing apparatus among the plurality of information processing apparatus comprising
a network interface card configured to:
wait for calculation target data from each of one or more other information processing apparatuses being included in the plurality of information processing apparatus;
carry out an average calculation that calculates an average value of a plurality of calculation target data including the waited target data waited without requiring bit expansion, using a butterfly network, the butterfly network accomplishing barrier synchronization by means of a butterfly; and
transmit the calculated average value to a second information processing apparatus being one of the plurality of information processing apparatuses and being different from the other information processing apparatuses.

8. The parallel computer system according to claim 7, wherein the calculation target data from each of the one or more other information processing apparatuses is the average value calculated in the other information processing apparatus.

9. The parallel computer system according to claim 7, wherein the second information processing apparatus uses the transmitted average value as the calculation target data.

10. The parallel computer system according to claim 7, wherein the circuitry carries out the average calculation by adding $2/\wedge n$ of the calculation target data and extracting higher bits from a sum obtained by the adding through n-bit shift that removes n lower bits.

11. The parallel computer system according to claim 7, wherein the first information processing apparatus comprises at least one processor and at least one transmitter, and
the processor waits for the calculation target data and carries out the average calculation, and
the transmitter transmits the calculated average value to the second information processing apparatus.

12. The parallel computer system according to claim 7, wherein the first information processing apparatus comprises a first processor and a second processor, and
the first processor waits for the calculation target data and the second processor carries out the average calculation.

13. A method of controlling an information processing apparatus among a plurality of information processing apparatus constituting a parallel computer system, the method comprising:
at a network interface card included in a first information processing apparatus among the plurality of the information processing apparatus,
waiting for calculation target data from each of one or more other information processing apparatuses being included in the plurality of information processing apparatus;
at the network interface card,
carrying out an average calculation that calculates an average value of a plurality of calculation target data including the calculation target data waited in the waiting without requiring bit expansion, using a butterfly network, the butterfly network accomplishing barrier synchronization by means of a butterfly; and
at the network interface card,
transmitting the average value calculated in the average calculation to a second information processing apparatus being one of the plurality of information processing apparatuses and being different from the other information processing apparatuses.

14. The method according to claim 13, wherein the calculation target data from each of the one or more other information processing apparatuses, the waited calculation target data, is the average value calculated in the other information processing apparatus.

15. The method according to claim 13, wherein the transmitted average value is used as the calculation target data in the second information processing apparatus.

16. The method according to claim 13, wherein the average calculation is carried out by adding $2^{\wedge}n$ of the calculation target data and extracting higher bits from a sum obtained by the adding through n-bit shift that removes n lower bits.

17. The method according to claim 13, wherein the first information processing apparatus further comprises at least one processor and at least one transmitter, and
the processor waits for the calculation target data and carries out the average calculation, and
the transmitter transmits the calculated average value to the second information processing apparatus.

18. The method according to claim 13, wherein the first information processing apparatus further comprises a first processor and a second processor, and
the first processor waits for the calculation target data and the second processor carries out the average calculation.

* * * * *